United States Patent [19]
Yu

[11] Patent Number: 5,276,840
[45] Date of Patent: Jan. 4, 1994

[54] DISK CACHING METHOD FOR WRITING DATA FROM COMPUTER MEMORY INCLUDING A STEP OF WRITING A PLURALITY OF PHYSICALLY ADJACENT BLOCKS IN A SINGLE I/O OPERATION

[75] Inventor: Ying-King Yu, Sunnyvale, Calif.

[73] Assignee: Acer Incorporated, Taipei, Taiwan

[21] Appl. No.: 674,531

[22] Filed: Mar. 22, 1991

[51] Int. Cl.$^5$ ............................................. G06F 12/02
[52] U.S. Cl. ................................. 395/425; 364/254.2; 364/254.3; 364/271.1; 364/238.6; 364/DIG. 1
[58] Field of Search ................... 364/200MS, 900MS; 395/400, 425

[56] References Cited
U.S. PATENT DOCUMENTS

| | | | |
|---|---|---|---|
| 4,410,942 | 10/1983 | Milligan et al. | 395/250 |
| 5,021,946 | 6/1991 | Korty | 395/600 |
| 5,053,945 | 10/1991 | Whisler | 364/239.6 |

OTHER PUBLICATIONS

Marshall K. McKusick, William N. Joy, Samuel J. Leffert and Robert S. Fabry, "A Fast File System for UNIX," pp. 1-16, Jul. 27, 1983, Berkeley, Calif.

Primary Examiner—Joseph L. Dixon
Assistant Examiner—Hiep T. Nguyen
Attorney, Agent, or Firm—Kenneth M. Kaslow

[57] ABSTRACT

A method for synchronously writing data from memory to a disk drive memory device minimizes the number of actual I/O operations by writing data to disk in large chunks. The method comprises the steps of: allocating an array for saving buffer pointers; mapping the data to the disk space; allocating a buffer for each block of disk space; copying the data into the buffer; saving a pointer to the buffer in the array and then writing physically adjacent blocks to disk in one I/O operation. The method also updates and reads address blocks in the buffer pool and writes them to disk only at the end of the write request.

7 Claims, 5 Drawing Sheets

DISK CACHING METHOD FOR WRITING DATA FROM COMPUTER MEMORY INCLUDING A STEP OF WRITING A PLURALITY OF PHYSICALLY ADJACENT BLOCKS IN A SINGLE I/O OPERATION

BACKGROUND OF THE INVENTION

1. Field of the Invention

The present invention relates to the exchange of data between a computer and a peripheral. In particular, the present invention relates to a method for synchronously writing data to a disk drive.

2. Description Of Related Art

Computer systems including mass storage media such as hard disks are well known. These computer systems include file systems for transferring data to and from the hard disk. A particular limitation in the operational speed of such computers is the input/output (I/O) throughput or the rate at which file systems can read and write data to mass storage devices. File system performance is important because of increased demand on I/O throughput in recent years. Existing file systems such as the UNIX System V file system have severe performance problems for sequential access to files on disk. This presents a particular problem for applications such as VLSI design and image processing applications that process large quantities of data in a small amounts of time, and thus, need to transfer data very quickly between disk and memory.

A particular problem with the prior art file systems is that data is written to the disk drive one block at a time and the blocks have a relatively small size (512–1024 bytes). For example, if the file system has four blocks of data to be transferred to the disk, prior art system would require four separate I/O operations to write the data from memory to the disk drive. This decreases performance because I/O operations are typically very slow in comparison to other operations performed by the central processing unit.

The prior art has attempted to increase the I/O throughput by increasing the block size. An increase in the block size improves throughput because it takes about the same amount of time to transfer a 1 K-byte block of data from memory to disk with a single I/O operation as to transfer a 4 K-byte block of data in a single I/O operation. Thus, rather than requiring four I/O operations to transfer a 3.5 K-byte file to disk, only a single I/O operation is required if the block sized is increased to 4 K-bytes. However, the problem with increasing the block size is that it wastes disk space. Most UNIX file systems include many very small files. For a 4 K-byte block size the wasted disk space can reach 45.6%.

The file systems also include a free list of blocks of the disk. The list identifies those portions of the disk that are available for use. Commonly, the free list is a linked list of pointers to free blocks. Initially, the linked list will identify free block in adjacent areas of the disk space. However, after use the free list deteriorates from its original form where adjacent blocks are listed sequentially into a random list of block positions. This deterioration decreases the I/O throughput since the seek time for the disk between each block access increased because the list does not identify sequential blocks on the disk. Attempts to increase system file performance have included schemes to store the data sequentially on the disk. However, these schemes have not been completely successful in increasing file system performance.

Prior art systems such as UNIX 4.2 Berkeley Software Distribution (BSD) and the Counterpoint Fast File System attempt to improve system I/O throughput. Both systems use a bit map of free blocks instead of a linked list of free blocks. Additionally, large data block I/O operations are provided to increase throughput. For example, the BSD allows transfers from disk to memory in blocks of up to 8 K-bytes and fragments of 1-7 K-bytes for reads and delayed writes. The Counterpoint Fast File System implements a fast file system algorithm in which free disk blocks are bit mapped. Reads and delayed writes are handled in clusters (up to 32 K bytes in one disk I/O). However, the use of the bit map and transfer of contiguous blocks of data to the disk drive was limited to delayed writes and reads. Synchronous writes, writes in which the file system waits for the write operation to be completed before proceeding with other operations, were not improved in the prior art file systems. Measurement of Network File System (NFS) server performance on systems implementing the Counterpoint Fast File System reveals that the network file system server continues to write very slowly to the disk (in the neighborhood of 30 K bytes/sec). The slowness in writing to disk is largely due to the inefficiency of the local file system in handling synchronous writes. The handling of synchronous writes is left the same as that of the original UNIX System V. Therefore, there is a need for an improved method for writing synchronously to mass storage devices.

SUMMARY OF THE INVENTION

The present invention overcomes the problems of the prior art with a method for synchronously writing data to a disk drive that significantly improves the speed of synchronous write requests for large data blocks. The method of the present invention reduces the number of actual I/O operations by writing data to disk in large chunks. Unnecessary I/O operations are also reduced by updating and reading the address blocks through the buffer pool and writing updates to disk only at the end of the write request. The method preferably comprises the steps of: allocating a data structure for saving buffer pointers; mapping the data to the disk space; retrieving a buffer for each block of disk space; copying the data into the buffer; saving a pointer to the buffer in an array within the structure; and writing physically adjacent blocks to disk in one I/O operation. The step of mapping the data preferably comprises the steps of saving buffer pointers in the array to minimize reading of the disk; updating the indirect address blocks through the saved buffers; and writing the updates to disk only once at the end of the write request.

DESCRIPTION OF THE PREFERRED EMBODIMENT

The preferred method of the present invention improves the speed for transferring data to a peripheral device. The present invention provides a method that significantly increases the speed for synchronously writing data from memory to disk by minimizing the number of actual I/O operations. The actual I/O operations are minimized by updating and reading address blocks in the buffer pool and writing the data to disk in large chunks, only at the end of a write request. The preferred embodiment of the present invention improves synchronous write requests.

Figure 1:
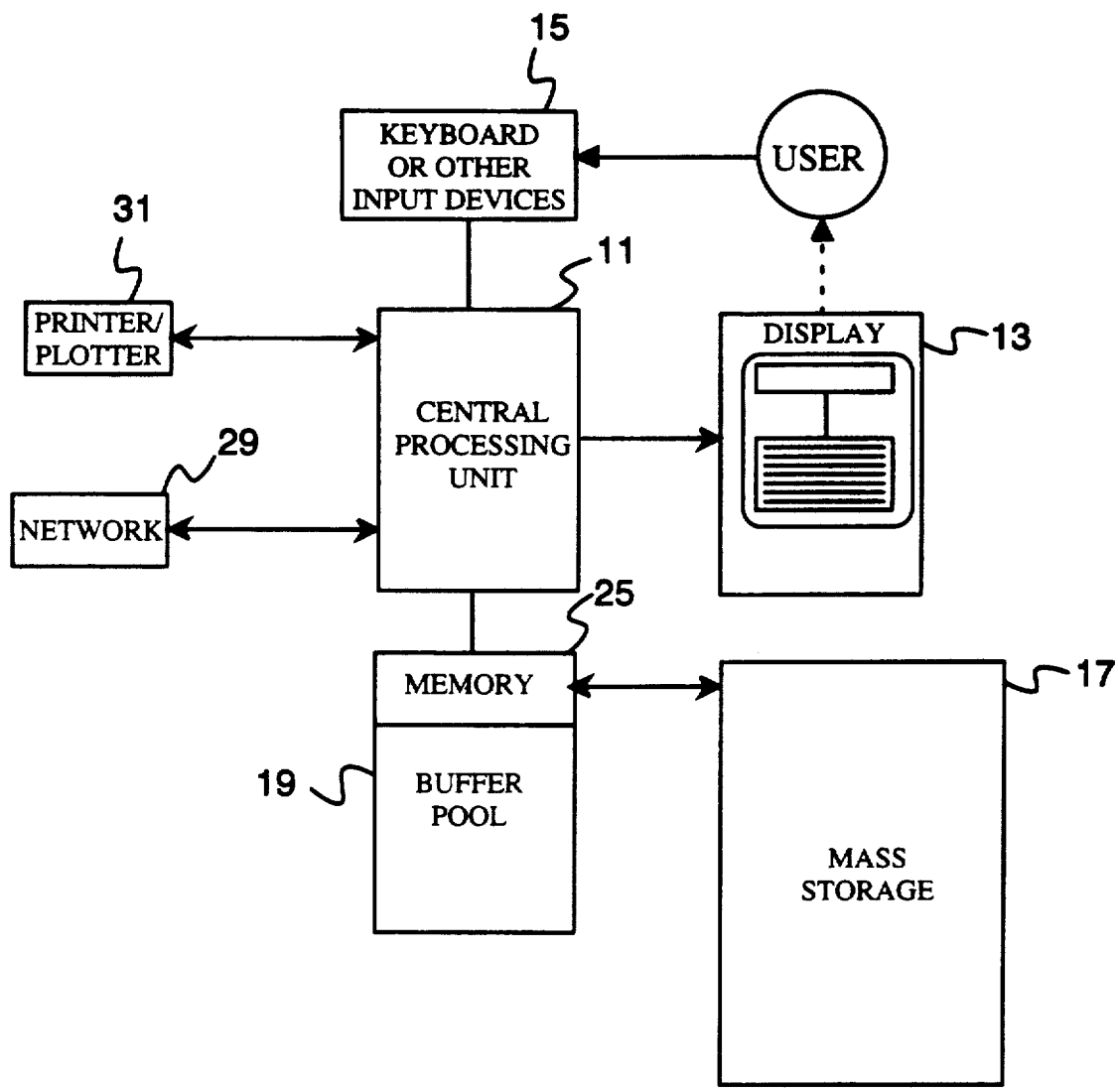
FIG. 1 is a block diagram of a computer system used for the preferred method of the present invention.

Referring now to FIG. 1, a block diagram of a preferred embodiment of a system for the method of the present invention is shown. It should be understood that the method of the present invention may be used on a single computer or a network of computers. The computer preferably comprises a central processing unit 11, a display device 13, an input device 15 and an addressable memory 25. The central processing unit 11 is coupled to and controls the display device 13 in response to inputs supplied to the processing unit 11 by user manipulation of the input device 15. The processing unit 11 is also coupled to a mass storage device 17 and a network 29 in a conventional architecture. A printer 31 is preferably coupled to the processing unit 11 to provide an output for information and a source for hard copies.

The display device 13 and input device 15 are conventional types as known in the art. For example, the display device 13 is a raster-type display used with the processing unit 11 in a conventional manner to produce images of characters generated from codes such as ASCII on the screen 21. The input device 15 is also a conventional type, preferably a keyboard with a "mouse" type controller.

The addressable memory 25 is a conventional type and preferably includes Random Access Memory (RAM) and Read Only Memory (ROM). The memory 25 includes a buffer pool 19 and is coupled to the mass storage device 17 in a conventional manner. The buffer pool 19 may be allocated according to the needs of the user. The mass storage device 17 is preferably a hard disk drive, but may also be other types of mass storage devices such as tape drives. In an exemplary embodiment, the method of the present invention is embodied in a Model 5000 system commercially available from Altos Computer Systems.

The processing unit 11 accesses information and instructions in memory 25, buffer pool 19 and the disk drive 17 for processing information in accordance with the operating sequences of the present invention. The present invention preferably uses a UNIX system V file system for its operating sequence. For example, the Acer or Counterpoint Fast File System (UNIX System V Compatible) may be used. In particular, a file system that includes a buffer pool and transfers data to disk in blocks of 1 K-bytes is used as the basis for the method of the present invention. Additionally, the file system preferably includes a bit map of free disk space for writing to the disk drive 17. The present invention advantageously improves the speed of writing data to the disk drive 17 by changing the method that the file system synchronously writes data from memory 25 to the disk drive 17.

Figure 2:
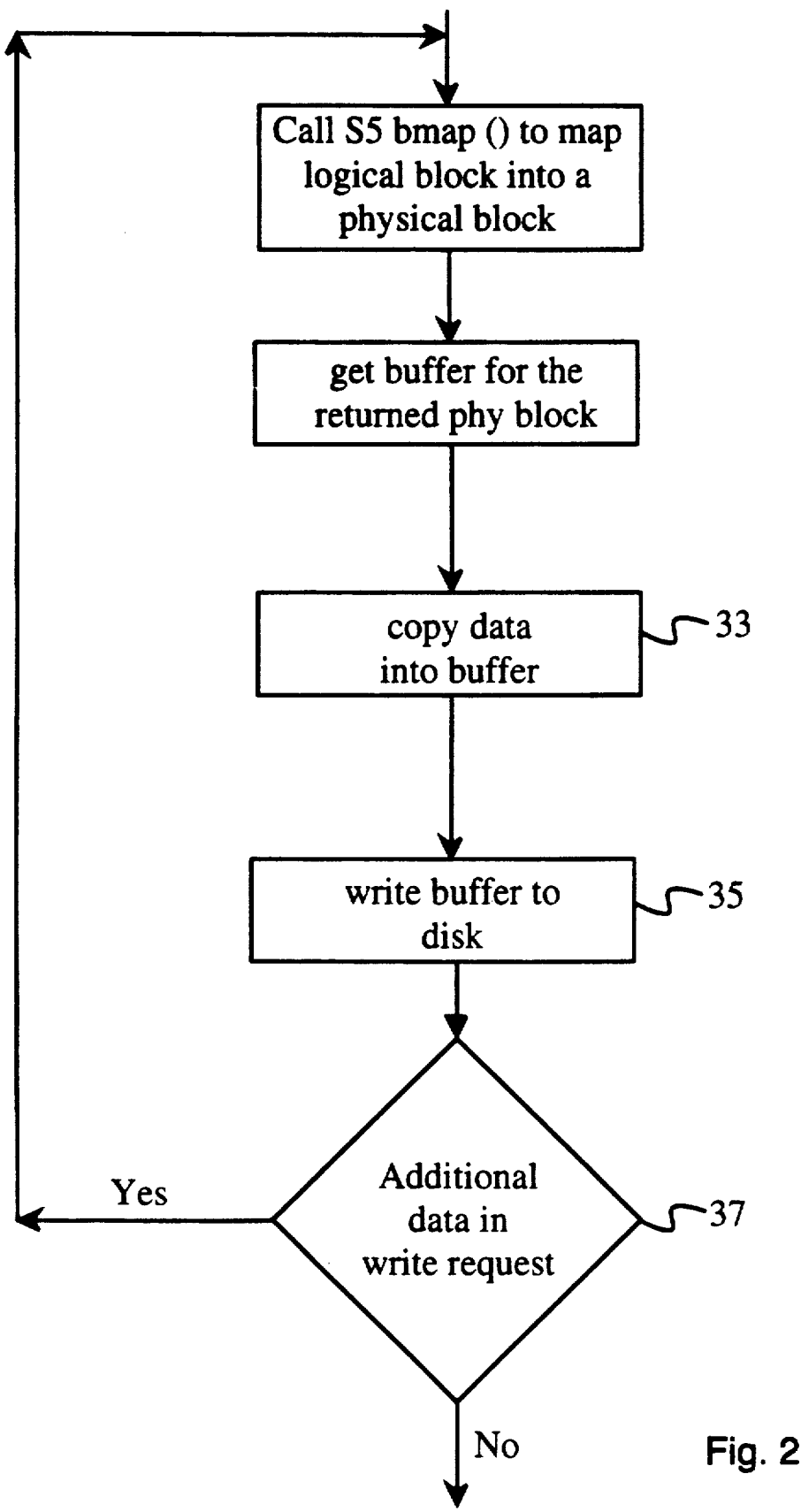
FIG. 2 is a flow chart of the prior art method for synchronously writing from memory to disk.

The prior art method for transferring data to the disk drive 17 is illustrated by the flow chart of FIG. 2. In the original design of UNIX, the data of a single synchronous write request is copied into one or more 1 K-byte system buffers in the buffer pool 19 and each buffer is written synchronously to disk one at a time in separate I/O operations. For example, the flow chart of FIG. 2 illustrates how 1 K-byte blocks of data are copied to the buffer in step 33 and a separate I/O operation transfers the data in the buffer to the disk drive 17 in step 35. Steps 33 and 35 are repeated until all the data in the write request has been transferred to the disk drive 17. Thus, minimally there is at least one I/O operation for each 1 K-byte of data transferred to the disk drive 17. For long files, buffers are also allocated for indirect address blocks. They are also written synchronously to disk immediately after each update even in the case of a delayed write. Therefore, a typical 8 K-byte network file system write request is translated into between 8 and 18 synchronous disk writes depending on how many indirect address blocks are involved.

The method of the present invention significantly increases the speed for writing data to disk by minimizing the number of actual I/O operations. The number of disk writes/reads are reduced by deferring the actual I/O operations until all necessary buffers are allocated and contain data. The method of the present invention preferably utilizes a bit map of the free disk space. Thus, most of the disk blocks allocated for data will be adjacent to each other. The uses of a bit map of free disk space allows each range of adjacent blocks to be written to disk in one I/O operation. The present method allows contiguous clusters of data up to 32 K-bytes to be written to disk 17 in a single I/O operation. In addition, the file system can perform multiple updates to indirect address blocks, however, these updates are written to the disk drive 17 in one operation.

Figure 3:
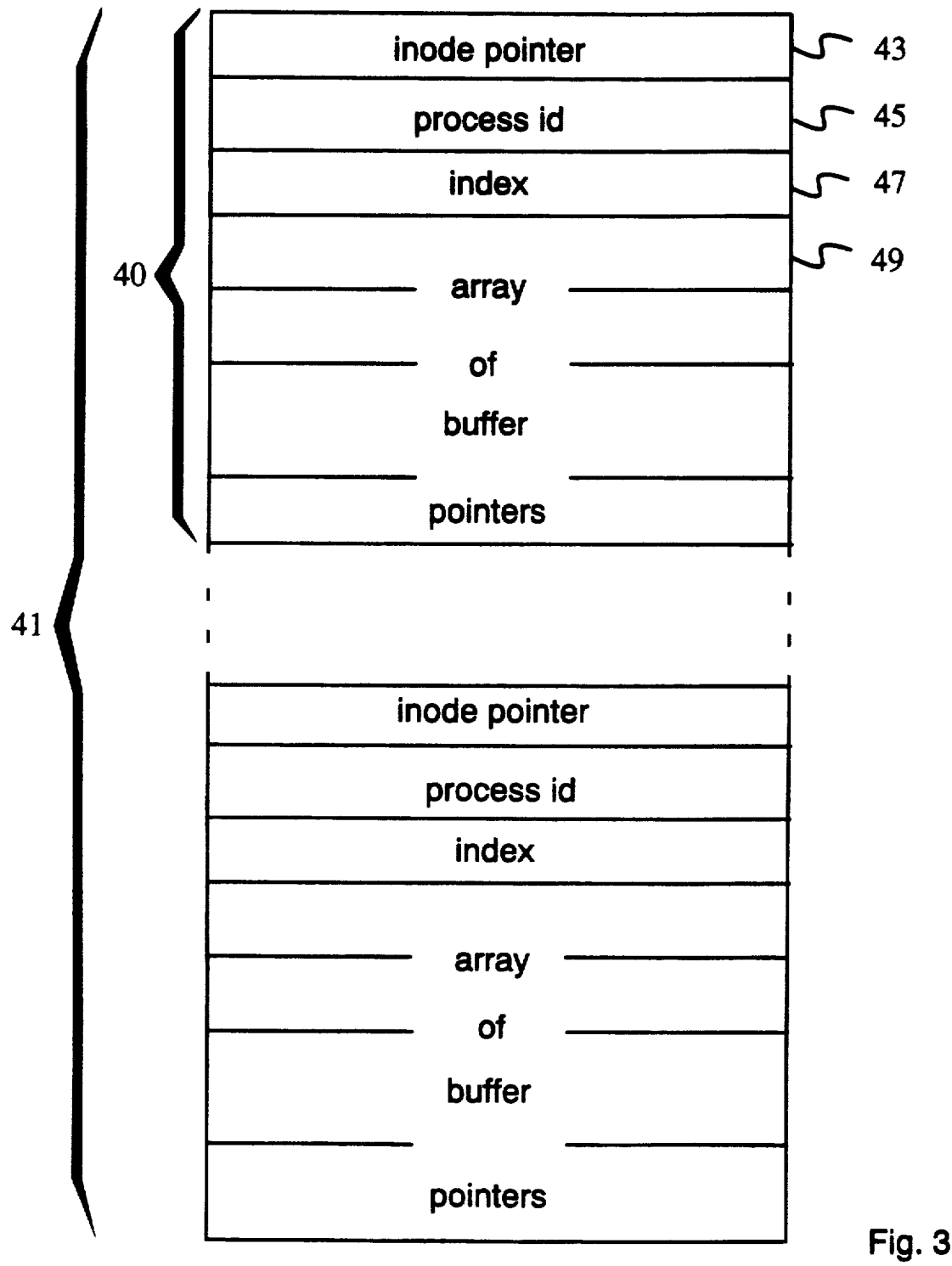
FIG. 3 is a block diagram of an array for saving information about outstanding synchronous write requests.
Figure 4:
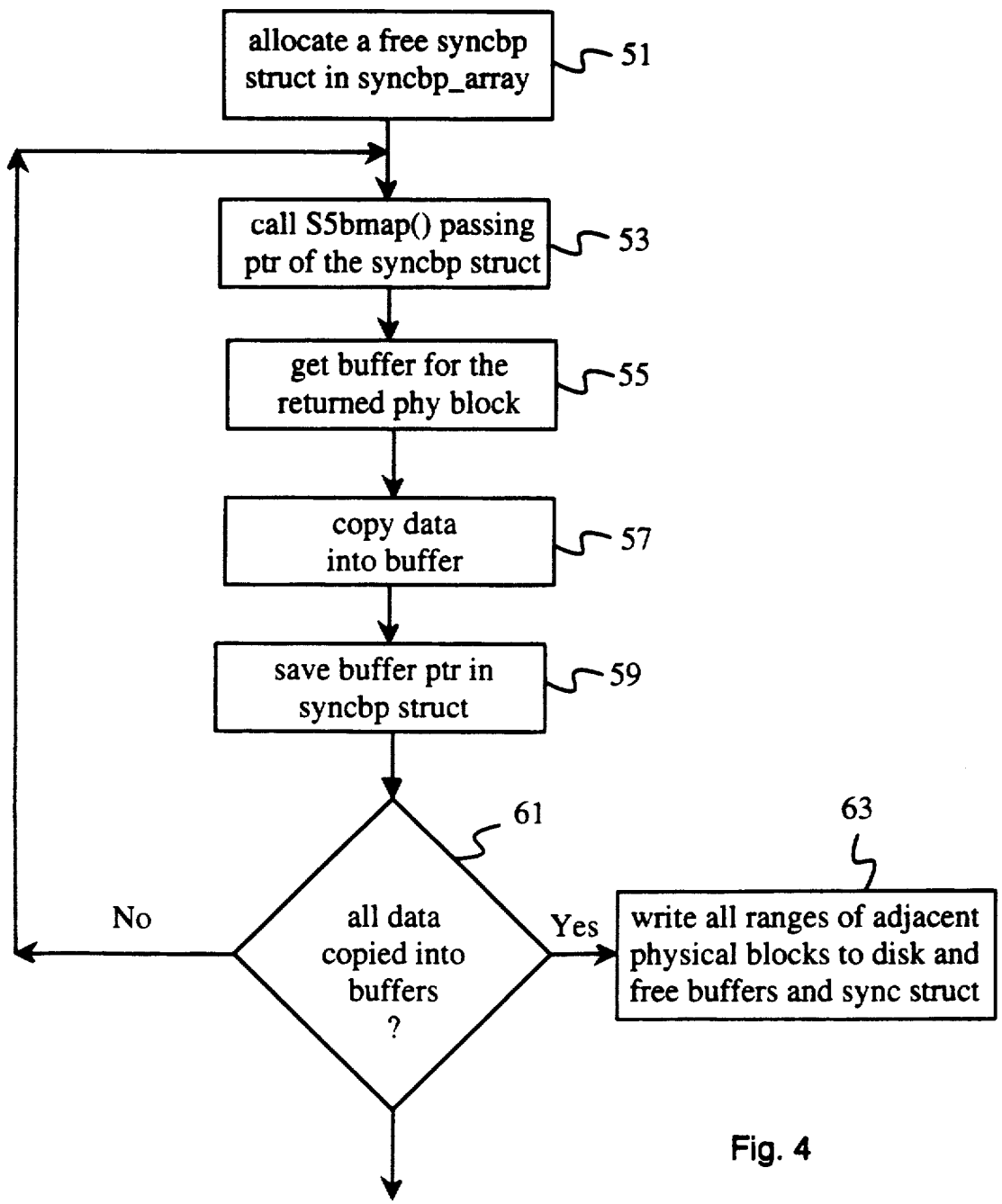
FIG. 4 is a flowchart of the preferred method for synchronously writing data from memory to a disk and FIG. 5 is a flowchart of the preferred method of mapping data to physical disk blocks.

Referring now to FIG. 4, the preferred method for writing data to the disk drive 17 will be described. In an initial step 51, the preferred method allocates a data structure 40 (SYNCBP) which contains an array 49 of buffer pointers for the data to be written to the disk drive 17. For each write request, pointers to all allocated buffers (for data or address) are preferably saved in array 49. The data structure 40 is allocated from an array 41 of data structures 40. As shown in FIG. 3, the format for the array 41 of data structures 40 is as follows:

```
#define BUFPTR_ARR_SZ 40    /* allow 32 K bytes of
                               data and up to 8 indirect
                               address data blocks */
#define SYNCBP_ARR_SZ 20    /* allow up to 20 data
                               structures */
struct syncbp {
    inode_t *inode;         /* ptr to inode doing sync
                               write */
    proc_t *proc_id;        /* process doing sync write */
    int index;              /* an index into the array */
    struct buf* bufptrs[BUFPTR_ARR_SZ]; /* saved
                               buffer ptr array*/
} syncbp_array[SYNCBP_ARR_SZ];
```

The file system used in the method of the present invention preferably comprises a global array 41 of 20 syncbp data structures 40. As noted above, each array 49 in the syncbp data structure 40 allows 32 K-bytes of data and up to 8 indirect addressing blocks. The syncbp data structure 40 is allocated on a per inode basis and the inode pointer field 43 of the data structure 40 is used for this purpose. Inode stands for index node. It is used in the file system to uniquely identify a file. Since the inode of the file in question is locked at the beginning of the write request, there is no danger that another process can access the same structure at the same time. The proc_id field 45 identifies the process making the write request. A slot in this array 41 is considered free if the inode pointer field 43 is null. If there are no more free structures in the array 41, a process will sleep waiting for a structure in the array 41 to become available. A process is sleeping if it is temporarily suspended from running. It will resume running after some event happens. The index field 47 is used as an index into the array 49 of buffer pointers. It points to the next slot for saving a buffer pointer.

In the next step 53, the preferred method of the present invention maps the data being written to a physical block of disk space one 1 K-byte buffer at a time. For each 1 K-byte of data in the write request, the "s5bmap" function is called which maps the data to a physical disk block and returns a physical block number, as will be described below with reference to FIG. 5. The "s5bmap" function is passed a pointer to the syncbp data structure 40 so that the buffer pointers can be saved in the array 49 In step 55, a buffer for the disk block is allocated, and in step 57, the data is copied into the buffer. In step 59, the present method advantageously saves the pointer to the buffer in the array 49 instead of writing to disk right away. This eliminates mandatory I/O operations for each 1 K-byte buffer. This process is repeated until all data in the write request are written into buffers in the system buffer pool. In step 61, the method of the present invention determines whether there is any remaining data in the write request that must be copied into buffers. If there is additional data, the method loops to step 53, otherwise the method proceeds to step 63. Finally, in step 63, the data in the buffers is written to disk. Once step 63 is reached, all necessary buffer pointers have been saved in the array 49. Lower level routines can then be used to write buffers corresponding to each range of adjacent disk blocks to disk in one I/O operation. Thus, the data blocks of an 8 K-byte write request can usually be done in one I/O operation.

For disk controllers that support scatter-gather operations, the write operations just mentioned are very fast. Scatter-gather operations are able to move data to and from a number of non-contiguous sections of memory in a single transfer. For example, separate I/O operations are typically required for each non-contiguous group of buffers. However, if the disk controller supports scatter-gather operations, up to 32 K-bytes of data in non-contiguous buffers could be transferred to the disk in a single I/O operation with the method of the present invention.

In some cases, multiple indirect address blocks are also written in one I/O operation. Since data blocks tend to be close to each other, and they are not necessarily close to the address blocks, further speed improvement is gained by alternating the order of writing address blocks and writing data blocks across write requests. This means that if the address blocks are written out first in a synchronous write request, the data blocks will be written out first in the next request. The arrangement minimizes disk head movement and thus increases I/O speed. Saved buffers are locked throughout the processing of a synchronous write request and are released immediately after the completion of all I/O operations in step 63. Similarly, the allocated syncbp data structure 40 will be freed at the same time by setting the inode field 43 to null.

Figure 5:
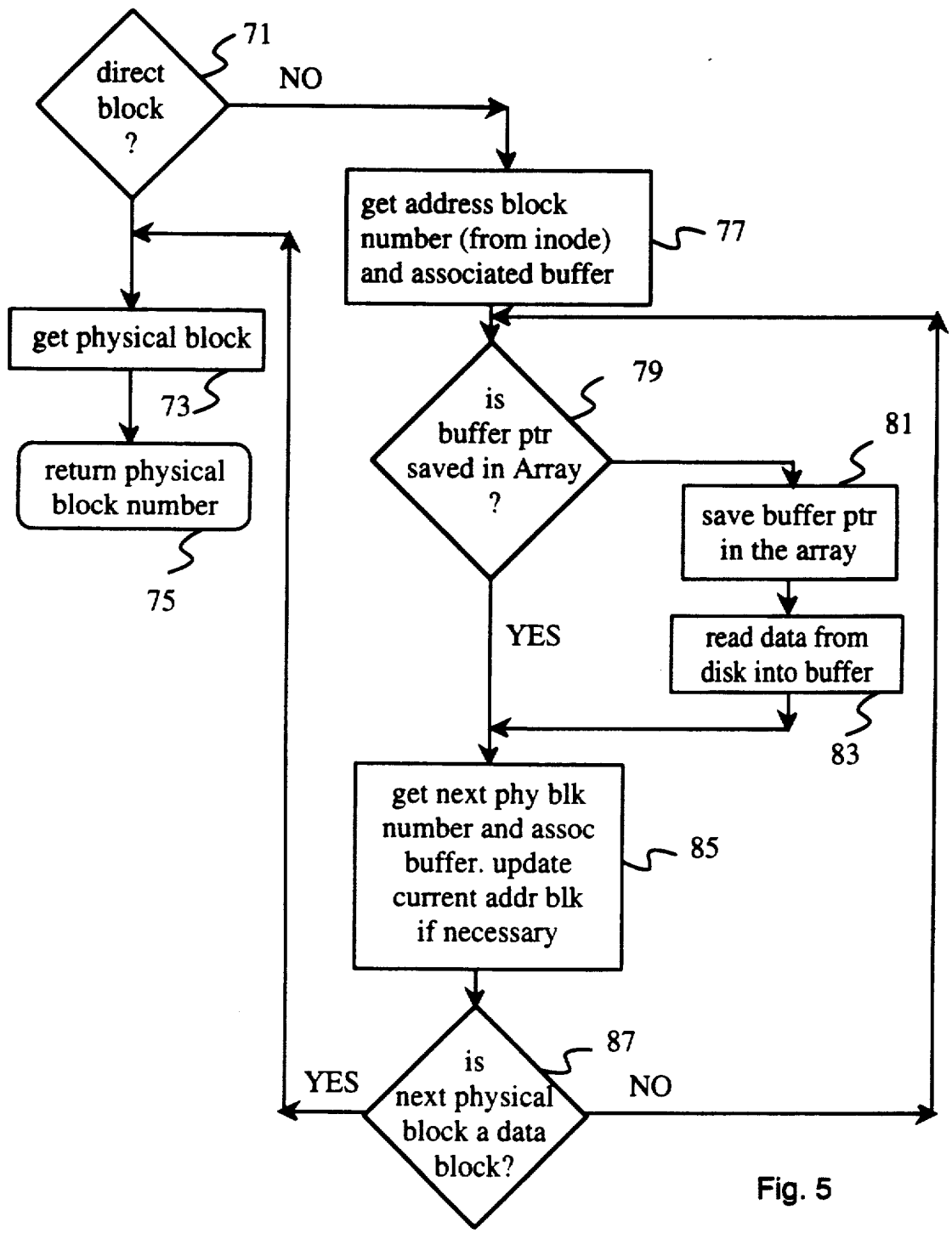

Referring now to FIG. 5, a preferred method for mapping "s5bmap" data to disk space is shown. The preferred mapping process initially determines whether direct addressing or indirect addressing is being used in step 71. If it is a direct block, the mapping method proceeds to step 73 where a physical block of disk is allocated and the associated block number is returned in step 75. On the other hand, if indirect addressing is used, then the file system continues to step 77 where the block number of the address block and the associated buffer are retrieved. The file system then determines whether the buffer pointer has been saved in the array 41. If the buffer pointer has been saved in the array, the method continues to step 85. This advantageously eliminates reading from the disk to update the indirect address. However, if the buffer pointer has not been saved then the method proceeds from step 79 to step 81 where the buffer pointer is saved in the array 49. Then in step 83, the data from disk 17 is read into the buffer to which the saved pointer identifies. This is in direct contrast to prior art file systems that require the disk read for all indirect addressing. The method then continues on to step 85. In step 85, the next physical block number and the associated buffer are retrieved similar to step 77. Since the file system allows multiple indirect addressing, the physical block may contain either data or an address. In step 87, the method tests whether the physical block retrieved in step 85 is a block of data. If it is a block of data, the method moves to steps 73 and to get the physical block and block number. If the block is not a data block, then the file system loops to step 79 and through steps 79–85 for multiple indirect addressing. This "s5bmap" process advantageously saves the pointer of the buffer for an address block in the array 49 if it has not already been saved (Step 81). Saving the buffer pointer has the advantage of avoiding extra reads and writes of address blocks and their overheads. An address block is looked up from the array 49 first and is read from disk only if it is not found there. Updates to the indirect address blocks are done through the saved buffers (Step 85). Since these buffers are written to disk only once at the end of the write request, the present method further eliminates extra disk writes.

What is claimed is:

1. A method for writing a given set of data in a computer system including memory, a buffer pool, and a disk having a disk space, said method comprising the steps of:

allocating a data structure in memory which contains an array for saving buffer pointers;

mapping the data onto the disk space;

allocating a buffer from the buffer pool for each block of disk space;

copying a block of the data from the memory into the buffer;

saving a pointer to the buffer in the array; and writing a plurality of buffers, corresponding to physically adjacent blocks in the disk space, to the disk in one I/O operation.

2. The method of claim 1, wherein the step of mapping further comprises the steps of:

allocating a buffer for each address block;

saving a pointer to the buffer in the array;

updating the buffer for the address block using a saved buffer pointer in the array; and writing the buffer for the address block to the disk drive only once at the end of a write request.

3. A method for synchronously writing data to a disk in response to a write request identifying the amount of data to be transferred to the disk, said method comprising the steps of:
   (a) allocating a data structure in memory which contains an array for saving buffer pointers;
   (b) determining a physical area of disk where a buffer of the data may be written;
   (c) allocating a buffer in a buffer pool for the data and corresponding to the physical area of the disk of step b;
   (d) copying the data from memory into the buffer allocated in the buffer pool;
   (e) saving a pointer to the buffer in the array;
   (f) repeating steps "b" through "e" for each buffer of data in the write request; and
   (g) writing the data stored in buffers corresponding to physically adjacent areas on the disk in one I/O operation.

4. The method of claim 3, further comprising the step of repeating step "g" until all buffers have been written to the disk drive.

5. The method of claim 3, further comprising the step of freeing the buffers after the data stored therein has been written to the disk drive.

6. The method of claim 3, wherein the step of determining the physical area further comprises the step of mapping data to a free disk space.

7. The method of claim 6, wherein the step of mapping further comprises the steps of:
   saving pointers to buffers associated with address blocks in the array;
   searching for an address block in the array;
   reading an address block from the disk only if it is not found in the array;
   updating the address blocks through the saved buffer pointers; and
   writing the buffers to disk only at the end of the write request.

* * * * *